United States Patent [19]

Hammond

[11] 4,402,073
[45] Aug. 30, 1983

[54] SPEECH AND DATA COMMUNICATION NETWORK

[75] Inventor: Gerald C. Hammond, Nuneaton, England

[73] Assignee: Vanderhoff Communications Ltd., Warwickshire, England

[21] Appl. No.: 242,338

[22] Filed: Mar. 10, 1981

[30] Foreign Application Priority Data

Mar. 11, 1980 [GB] United Kingdom ............... 8008232

[51] Int. Cl.³ ........................... H04J 3/02; H04J 6/00; H04J 9/00
[52] U.S. Cl. ................................... 370/9; 370/11; 370/85; 370/92; 375/22
[58] Field of Search ................... 340/825.5; 370/9, 11, 370/85, 89, 92, 95, 100, 110.4; 375/22, 113

[56] References Cited

U.S. PATENT DOCUMENTS

| 2,753,398 | 7/1956 | Pinet | 370/110.4 |
| 3,178,515 | 4/1965 | Bramer et al. | 370/11 |
| 3,916,108 | 10/1975 | Schwartz | 370/85 |
| 4,210,780 | 7/1980 | Hopkins et al. | 370/85 |

FOREIGN PATENT DOCUMENTS

| WO79/00422 | 7/1979 | PCT Int'l Appl. |
| 1033398 | 6/1966 | United Kingdom . |
| 1411056 | 10/1975 | United Kingdom . |
| 1413690 | 11/1975 | United Kingdom . |
| 1414574 | 11/1975 | United Kingdom . |
| 1449063 | 9/1976 | United Kingdom . |

Primary Examiner—Benedict V. Safourek
Attorney, Agent, or Firm—Robert F. O'Connell

[57] ABSTRACT

The network comprises a two-wire bus (coaxial cable) and a source of synchronizing pulses connected to the bus for marking off TDM cycles of about 125 us duration comprising a control slot and 8 links, i.e. pairs of time slots. The bus links devices, each comprising a microprocessor, TDM interface, bus interface and audio circuits. To set up a call the calling microprocessor finds a non-busy link and addresses in the control slot the called device which acknowledges. The TDM interface of the called device transmits pulses in one slot of the selected link while the TDM interface of the calling device transmits pulses in the other slot of the selected link. The bus interface effects pulse width modulation and demodulation of the pulses for full duplex speech transmission. The microprocessor also sends and receives digital data by the omission of pulses representing 0 bits. The data is formatted in 8-bit bytes framed by single 0 start and stop bits separated by guard bits, so that the longest possible interruption to speech transmission is 10 TDM cycles, i.e. about 1ms. This is short enough to allow simultaneous transmission of speech of reasonable quality and low rate digital data (e.g. from a keypad).

10 Claims, 12 Drawing Figures

SPEECH AND DATA COMMUNICATION NETWORK

The present invention relates to a speech and data communication network particularly suited for use in an office where an intercom telephone facility is required and where digital data also has to be transmitted between data processing or word processing units, for example. Very many suitable communication networks have been proposed falling into two classes; those which employ a central exchange and those which employ distributed control. The latter type of network is attractive for smaller networks which can be installed and extended without the high costs associated with a central exchange. The object of the present invention is to provide a network of the distributed type which allows both speech and digital data to be transmitted and avoids the need to wire an office separately for intercom and data transmission.

According to the present invention, there is provided a speech and data communication network comprising a two-wire bus, a source of synchronizing pulses connected to the bus, the pulses marking off TDM cycles comprising interleaved time slots, including a control time slot and a plurality of working time slots, a plurality of devices connected to the bus and each including a microprocessor capable of feeding control data pulses into the control time slot, and of responding to data pulses in the control time slot, to establish a channel between a calling device and a called device by selecting a free working time slot, a bus interface enabled to transmit or receive a sampled audio signal in the form of analogue modulated pulses in a selected time slot, and wherein the microprocessor is arranged to transmit digital message data by binary modulation of pulses in a selected time slot and to receive digital message data as binary modulated pulses in a selected time slot.

The analogue modulation of pulses may be amplitude modulation but is preferably pulse width modulation (PWM). Binary modulation means the normal representation of binary data in accordance with the presence and absence of pulses. One advantage of the invention is that it is possible to transmit speech and digital data simultaneously. Randomly distributed 0's (missing pulses) will not prevent reconstruction of a clear speech signal by conventional filtering at such a sampling rate. If there is a high proportion of 0's and, in particular, groups of consecutive 0's, the speech may be degraded by distortion.

In the invention as defined above, the devices are capable of all of the following functions:
1. Sending control data (to set up a call)
2. Responding to control data (to become a called device)
3. Transmitting speech
4. Receiving speech
5. Transmitting digital message data
6. Receiving digital message data.

It is obvious that devices may be included which do not possess all facilities. For example, there may be pure intercom devices lacking facilities 5 and 6. Similarly, devices may possess external facilities, e.g. a tie-line interface.

The two-wire bus is preferably a coaxial cable. The bus can have branches if bus couplers are provided at the nodes. The bus preferably carries the DC power supply to all devices. For convenience the DC power supply unit can be in the same unit as the clock pulse source. The clock source preferably also injects a high frequency signal at a low level on to the bus and the said devices recover this signal which is used to injection lock the local crystal frequency references to a common frequency, in order to prevent jitter noise when sending audio information.

The message time slots are preferably grouped in pairs, each of which will be called a link. When a channel is established a free link is found and the two time slots of a link are assigned to transmission from the calling device and from the called device respectively. Each microprocessor can be programmed to find a free link by testing links found with no pulses in a predetermined number of TDM cycles. In the embodiment to be described data is transmitted as 8-bit bytes framed by single 0-bits with guard groups of 1-bits between the end bit of one frame and the start bit of the next frame. An occupied link can therefore never have more than ten consecutive 0-bits and a free link is recognized when there are no pulses in eleven TDM cycles.

Once a free link has been found, the calling device checks that the control time slot is free (no pulses detected in 100 TDM cycles) and then sets up the call by addressing the called device with identification of the link to be employed.

The invention will be described in more detail, by way of example, with reference to the accompanying drawings, in which.

Figure 1:
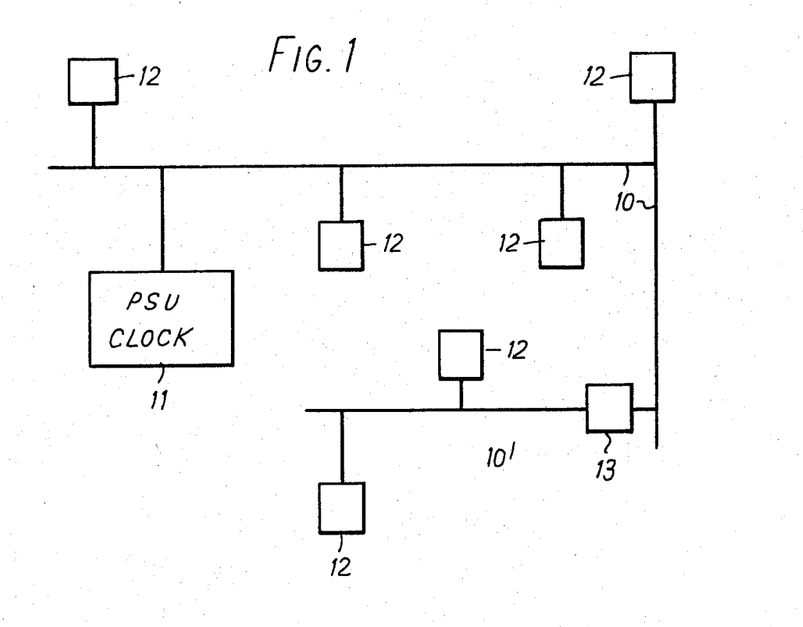
FIG. 1 is a block diagram of a complete communication network.

FIG. 1 shows a coaxial cable 10 forming a bus interconnecting a power supply and clock unit 11 and a plurality of terminal devices 12. Although a small number of devices is shown there may in practice be up to about 100. It may be possible to wire one cable round the building in which the network is installed but one or more branches 10' may be found desirable. Each branch 10' is coupled into the main bus 10 by a bus coupler 13 which provides bi-directional buffering and includes its own injection locked crystal for relaying the high frequency signal on to the branch.

Figure 2:
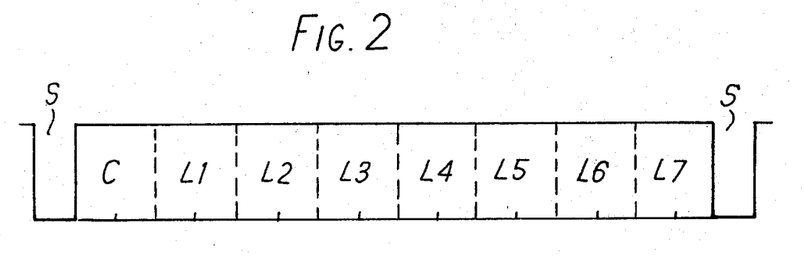
FIG. 2 is a diagram illustrating the format of a TDM cycle.

The power supply and clock unit 11 provides a regulated positive DC supply and superimposes thereon the high frequency signal and negative-going synchronizing pulses S shown in FIG. 2, which mark off TDM cycles. The high frequency signal is a low level crystal-frequency signal, at 4.433 MHz in one specific embodiment. This signal is not shown in FIG. 2 but is superimposed upon the high level of the waveform. Each TDM cycle is divided into 17 time slots comprising the synch pulse slot and 8 time pulse pairs of which the first pair forms the control time slot C and the other 7 pairs form 7 links L1 to L7. The basic clock period is 0.2257 μs. Each slot has a width of 32 clock periods, i.e. 7.224 μs and the TDM cycle period (17 time slots) is therefore 122.8 μs with a frequency (sampling frequency) of 8.14 kHz which is compatible with CODEC and other common PCM voice quality links.

The power supply and clock unit (FIG. 3) comprises a conventional arrangement of transformer 15, full wave rectifier 16 and regulator 17 (e.g. a 7815 integrated circuit) with associated smoothing capacitors C1, C2 and also an inductor L1. A square wave from a 4.43 MHz crystal X1 is applied to a divider chain comprising a flip-flop 20, 4-bit counter 21, 4-bit counter 22 and flip-flop 23. The flip-flop 20 and counter 21 divide down to the time slot frequency. The counter 22 and flip-flop 23 have outputs connected to a gate 24 which effects reset at a count of 17, whereby the TDM cycle is established. A decoder 25 decodes part of the cycle of the counter 20, 21 to establish the sync pulse width of 16×0.2257 μs=3.6 μs and a gate 26 decodes count 1 to the counter 22,23 and passes the sync pulse only in the sync time slot.

Figure 3:
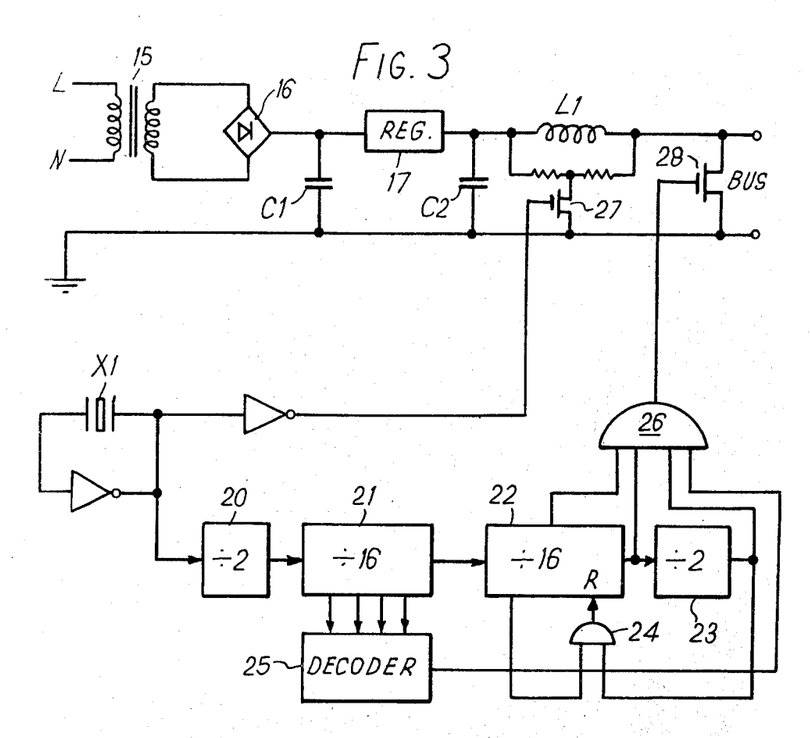
FIG. 3 is a block diagram of a power supply and clock unit.

The low level 4.433 MHz waveform is injected via FET 27 and the sync pulse from gate 26 turns on a FET 28 to short out the power supply during each sync pulse.

The devices 12 will take various forms, e.g. any of the well known peripherals such as VDU terminals, printers, memory devices and so on, each of which may have its associated speech intercom. The nature of the peripherals forms no part of the present invention; it is assumed that the microprocessor at each station is programmed to handle data as required in ways which can be entirely conventional. The invention concerns communication between devices, not between processors and peripherals.

Figure 4:
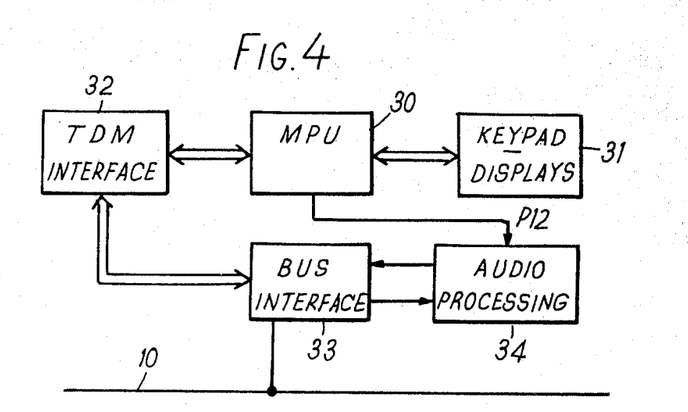
FIG. 4 is a block diagram of one device or terminal of the network.

FIG. 4 shows the essentials of a device comprising microprocessor 30 with associated keypad and display unit 31, TDM interface 32, bus interface 33 and audio processing unit 34. The microprocessor 30 is an 8048 family microcomputer of which the bidirectional I/O port DB0-DB7 is assigned to miscellaneous control functions, the I/O port 1 (P10-P17) controls the TDM interface 32 and the I/O port 2(P20-P27) receives input keypad data. The TDM interface 32 controls transmission and reception in the control slot and selected link. The bus interface 33 extracts pulses and the high frequency signal from the bus and sends pulses on the bus and includes a pulse width modulator and demodulator. The audio processing unit 34 effects processing of the analogue speech signal.

Figure 5:
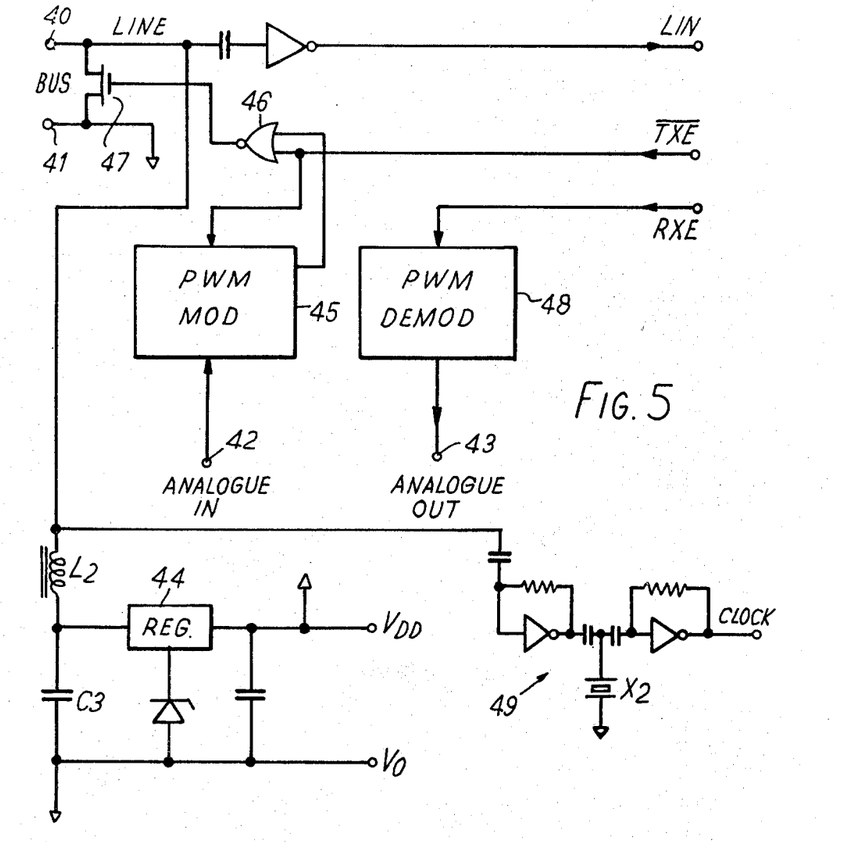
FIG. 5 is a diagram of the bus interface circuit of one device.

The bus interface 33 is shown in FIG. 5 and comprises terminals 40 and 41 connected to the inner conductor (LINE) and screen respectively on the coaxial bus 10. The bus interface communicates with the TDM interface via LIN=buffered LINE for input of pulses, $\overline{\text{TXE}}$=not transmit enable and TXE=receive enable, which provides pulses which are to be demodulated. The bus interface communicates with the audio circuits via an analogue input 42 and analogue output 43.

A power supply circuit connected to LINE and comprising a regulator 44 (7805 integrated circuit) extracts $V_{DD}$=+10.5 v from the line DC, inductor L2 and capacitor C3 smoothing out the pulsations caused by the sync and data pulses. A clock circuit 49 including crystal X2 is injection locked by the 4.433 MHz signal on the line and provides the local 4.433 MHz clock.

So far as transmission is concerned, $\overline{\text{TXE}}$ is normally high but goes low in one half of the selected link, i.e. one of the two time slots making up the link. The convention is that a called device transmits in the first slot, a calling device transmits in the second slot. The $\overline{\text{TXE}}$ pulse causes a pulse width modulator 45 to inject a PWM pulse via NOR gate 46 and FET 47 which shorts out the line. So far as reception is concerned, the TDM interface returns received pulses as TXE only from the appropriate slot of the selected link and these are demodulated by PWM demodulator 48.

Figure 6:
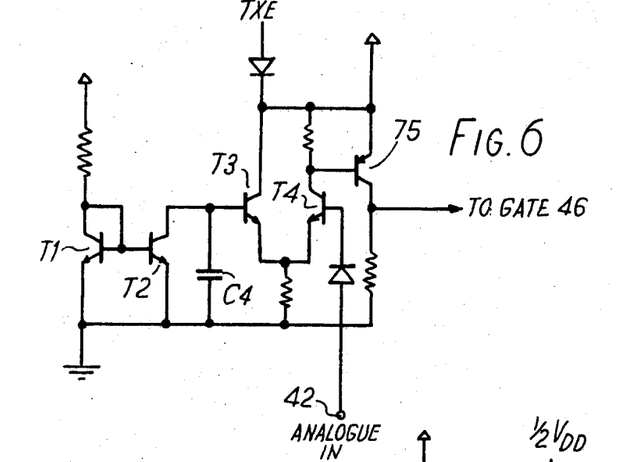
FIG. 6 is a circuit diagram of a PWM modulator.
Figure 7:
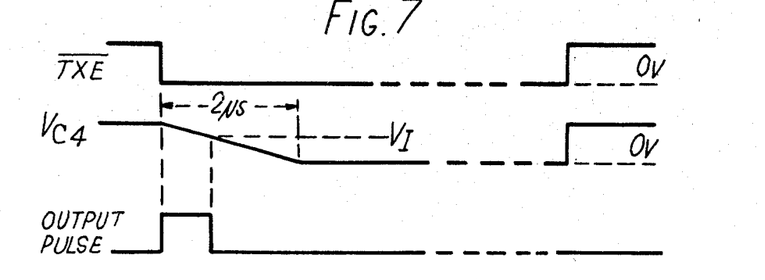
FIG. 7 shows waveforms relating to the operation of the modulator.

FIG. 6 shows the PWM modulator, based on a current mirror transistor pair. $\overline{\text{TXE}}$ is normally high so that C4 is normally charged. When $\overline{\text{TXE}}$ goes low, the current mirror T1, T2 linearly discharges C4 as shown in FIG. 7 where $V_{C4}$ is the potential on C4. $V_C$ and the analogue input $V_I$ are applied to the two sides of a comparator T3, T4 which normally holds the emitter of T5 low. An output pulse, for turning on FET 47 (FIG. 5) appears at the output of NOR gate 46 when $\overline{\text{TXE}}$ is low and the emitter of T5 is low. When $V_{C4}$ falls to the level of $V_I$, the emitter of T5 goes high to terminate the output pulse. $\overline{\text{TXE}}$ has to go high again before another pulse can be sent out.

The peak capacitor voltage (C4) and discharge current are both directly proportional to the supply voltage and the ramp time of $V_{C4}$ (FIG. 7) is substantially independent of supply voltage. The ramp duration is about 2 μs. The output pulse duration t is given by:

$$t = \frac{RC}{2}\left(1 \pm \frac{V_I}{V_{DD}}\right)$$

where RC is the effective time constant for discharge of C4, $V_I$ is the modulation amplitude and $V_{DD}$ is the supply voltage. When $V_I$=0, t is about 1 μs and $V_I$ is restricted to a range such that the maximum modulation is ±0.5 μs so that data pulses vary in width from 0.5 μs to 1.5 μs. Very stable and reproduceable performance is achieved because the ramp time is independent of supply voltage and because of the use of integrated circuit transistor arrays.

Figures 8, 9:
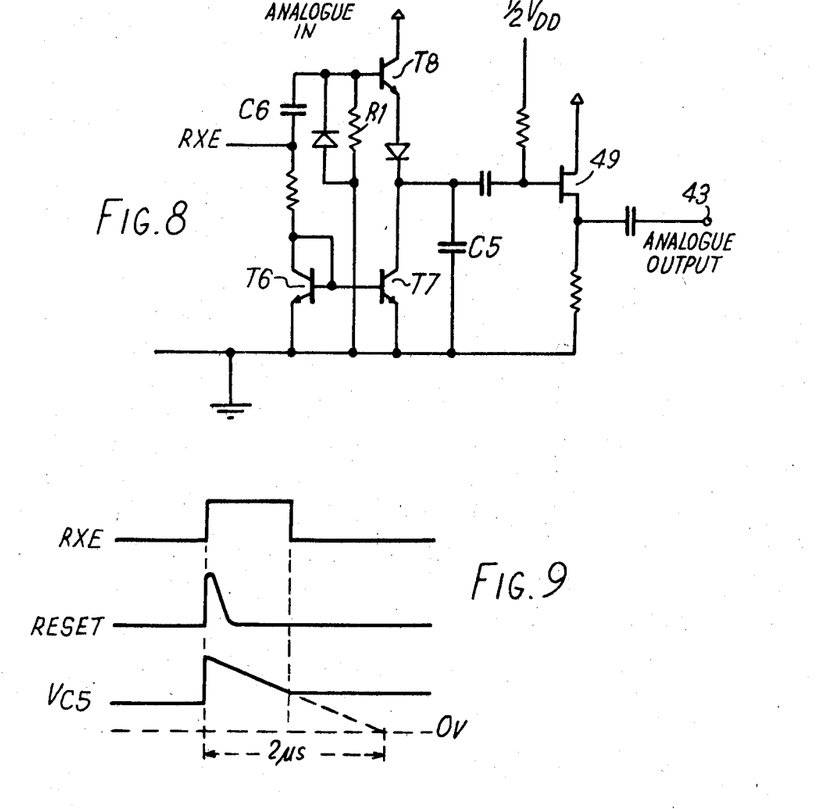
FIG. 8 is a circuit diagram of a PWM demodulator.
FIG. 9 shows waveforms relating to the operation of the demodulator.

Referring to FIG. 8, pulses selected by the TDM interface, are applied to the demodulator input RXE which is a reset, integrate and hold circuit. T6 and T7 form a current mirror which is normally off but which discharges capacitor C5 to produce a ramp voltage $V_{C5}$ (FIG. 9) when triggered by a incoming pulse RXE. T8 with the differentiating circuit C6, R1 on its input produces a reset pulse on the rising edge of RXE and resets $V_{C5}$ from the held level of the previous sample to the starting level for the ramp and the duration of the ramp is determined by the duration of RXE. The level held at the end of the ramp is the demodulated analogue output level which is output via FET 49. The duty cycle of the pulses being demodulated is low and so sampling frequency noise in the idle (no analogue modulation) state is well below that of a full level baseband signal.

Figure 10:
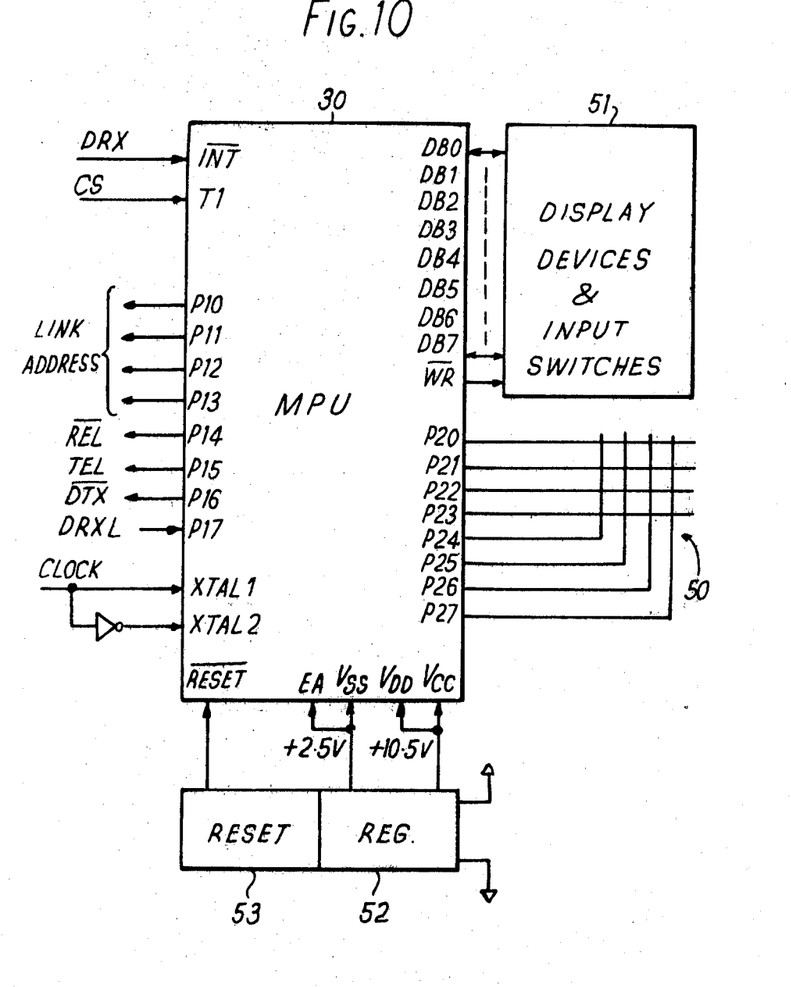
FIG. 10 shows the pin connections of the microprocessor.

FIG. 10 shows the 8048 microprocessor 30 with its standard pin designations (omitting unused pins). Simplification has been effected by also omitting some minor, conventional details such as input resistors and catching diodes. A 16-key keypad 50 is connected to port P20-27 and is represented simply by a 4×4 grid of conductors. The key at each intersection closes a switch between the conductors thereat. The processor is arranged, in well known manner, to scan continually for keypad inputs. In the embodiment shown, the port DB0-DB7 is used only for input from and output to a set of switches and display devices 51, which may comprise say four lamps on DB0-DB3 for indicating states such as, call in progress, calls being transferred, etc., serial output on DB4, DB5 to display calling party, called party or other information on a suitable display device, and a tone output on DB7 for generating the sound tones such as dialling tone, busy tone, etc. The switches are used to patch in the identity of each device (7 bits) in a manner well known per se while switch 8 (DB7) may be used to control "paging" response. When switch 8 is not set, a paging call will interrupt all calls in progress but switch 8 can be operated on any device to lock out a paging call, e.g. when the device is used for a data link.

Figure 11:
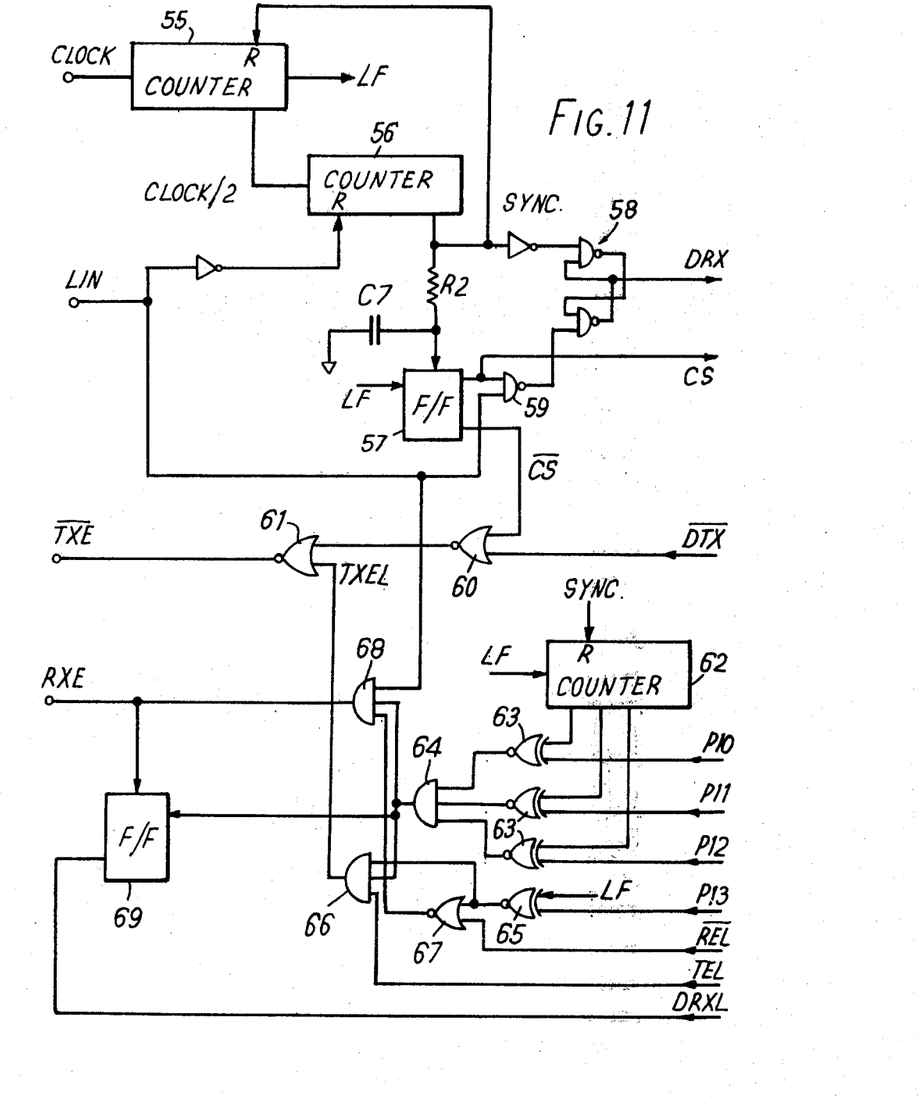
FIG. 11 shows a TDM multiplexer.

A conventional regulating circuit 52 and associated power-on reset circuit 53 provided. CLOCK (from FIG. 5) and $\overline{\text{CLOCK}}$ are applfied to XTAL1 and XTAL2. The remaining pins are used to communicate with the TDM interface. P10-P13 provide the link address selecting the link in which data is to be transmitted/received. The other signals shown in FIGS. 10 and 11 have the following significances:

LIN—Buffered input from line
$\overline{\text{TXE}}$—Not transmit enable
RXE—Receive enable
CLOCK—Crystal input
SYNC—Detected synchronizing signal
CS—Control slot
LF—Link frequency clock
$\overline{\text{REL}}$—Not receive enable in a link
TEL—Transmit enable in a link
TXEL—Transmit enable in selected link
DTX—Data to transmit in control slot
DRX—Data received in control slot
DRXL—Data received in link Referring then to FIG. 11 (the TDM interface), a counter 55 receives CLOCK and SYNC and provides CLOCK/2 (half clock-rate) and LF (link frequency rate) waveforms, CLOCK/2 is applied to a counter 56 which is allowed to count when LIN=1, i.e. $\overline{\text{LINE}}$=0, and therefore counts during any received pulse. As already indicated, the sync pulses S(FIG. 2) have a width of 3.6 μs whereas the maximum width of a data pulse is 1.5 μs. Discrimination is therefore easy and the counter 56 produces an overflow, which is SYNC, on reaching a count of 7 which indicates that a pulse has persisted for $0.2257 \times 2 \times 7 = 3.16$ μs and must therefore be a sync pulse. A flip-flop 57 set by SYNC, suitably delayed by R2, C7 to provide clearance between the sync pulses and data in the control slot, and reset by LF provides CS to denote the control slot following SYNC. A bistable circuit 58 provides the control data input to the microprocessor since its output DRX is true only LIN and CS are both true and hence force the output of NAND gate 59 false.

So far as transmission of data in the control slot is concerned, the flip-flop 57 also provides $\overline{\text{CS}}$ which when true, i.e. outside the control slot, disables a NOR gate 60. The microcomputer output control data as $\overline{\text{DTX}}$ which is copied in the control slot, with inversion, at the output of gate 60 and copied again with another inversion at the output of a NOR gate 61, which output is $\overline{\text{TXE}}$.

Links selection is controlled by a counter 62 which is reset by SYNC and counts LF. The microprocessor denotes the links in which it wishes to receive/transmit by three bits on P10, P11 and P12 whose values 001 to 111 correspond to L1 to L7 (FIG. 2). (The bit combination 000 is not used; it would correspond to the control slot.) A match between the three output bits and the state of the counter 62 is detected by three exclusive NOR gates 63 and an AND gate 64.

The signal on P13 is used to determine whether transmission is in the first half of a link and reception in the second half, or vice versa, in accordance with the convention given above. If the station is called, P13=1 and an exclusive NOR gate 65 provides a true output in the first (true) half of LF. An AND gate 65 is therefore enabled in the first half of the selected link to transmit the data from the microprocessor represented by TEL. The true output of gate 65 disables a NOR gate 67 but the latter provides a true output in the second half LF if $\overline{\text{REL}}$ is false. An AND gate 68 is then enabled in the second half of the selected link to pass data pulses from LIN to RXE for demodulation in the bus interface.

If the station is calling, P13=0, gate 65 provides a true output in the second half of LF and gate 67 provides a true output in the first half of LF (assuming $\overline{\text{REL}}$=0). Reception and transmission then take place in the first and second halves respectively of the selected link.

The RXE pulses are also latched into a flip-flop 69, after it has been reset on the rising edge of the output of the link-selecting gate 64 and the flip-flop provides the data input to the microcomputer.

The computer thus outputs control data as $\overline{\text{DTX}}$, receives control data as DRX, outputs link data as TEL and receives link data as DRXL, all in serial format, one bit per TDM cycle. All data sent in the control slot has a fixed format comprising a preamble bit, byte 1, a one bit space, byte 2, a one bit space byte 3, requiring a total of 27 TDM cycles. Bytes 1 and 2 are the addresses of the addressed and addressing station respectively and byte 3 is an instruction, e.g. a request to set up or clear down a call or an acknowledgement (handshake). All control slot data is received by all microprocessors. If the first byte matches the own address held in the microprocessor the microprocessor stores the second byte and acts on the third byte. These bytes are ignored if there is no address match. Additional addresses outside the normal identity range 00 to 99 are reserved for special facilities, eg. "Group Paging."

In setting up a call, the calling station will first find a free link (denoted link X) as explained above and check if the control slot is free. These are software functions of the microprocessor which merely has to count DRXL=0 for 11 cycles and DRX=0 for 100 cycles respectively. The calling station then sends out the control message constituted by the called station address, its own address and the instruction "set up call using link X." The called station responds immediately with the acknowledgement message constituted by the calling station address, its own address, and the instruction "am setting up call using link X." It also sets P10-P12 correctly, sets P13=1 and commences to transmit pulses in the first half of link X. The calling station responds to the acknowledgement signal by setting its P10-P12 correctly, setting P13=0 and commences to transmit pulses in the second half of link X. A bidirectional link has thus been set up and can carry analogue, speech information and digital data output serially by either microprocessor on TEL and received by the other on DRXL. The analogue information is encoded by pulse width modulation. The digital data involves missing out pulses for 0 bits. Using a normal synchronous signalling format with start and stop bits, 8 bit data bytes can be transmitted between parties. (A longer null character could cause system failure as another party might see a link as free). For low data rates, e.g. information from the keypad 50 at a station, the effect on the transmitted analogue information is very slight. The worst case character corresponds to all 8 data bits=0 which produces an interruption of only about 1 ms. If data is 7 bits plus an odd parity bit there must be at least one bit=1 in the sequence of 10 bits.

For higher data rates, e.g. continuous modem type applications, the analogue information might be more seriously degraded but it would be unlikely then that speech and data would be required to be transmitted simultaneously. Data can be transmitted in full duplex in any link at up to at least 4800 baud.

Figure 12:
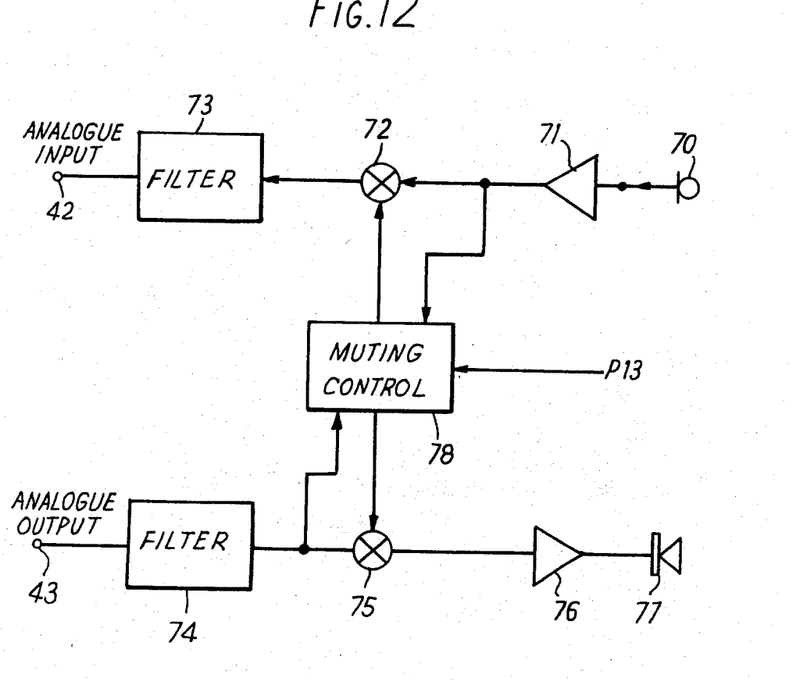
FIG. 12 shows audio circuits in block form.

FIG. 12 shows the audio processing circuit 34 which includes voice operated muting allowing the use of hands-free, loudspeaking telephones. The microphone 70 is connected through is preamplifier 71, a muting switch 72 and a filter 73 giving the required equalization to the analogue input terminal 42 of FIG. 6. The analogue output terminal 43 of FIG. 8 is connected through a filter 74, making switch 75 and power amplifier 76 to the loudspeaker 77. The filter 74 is basically a low pass filter which smooths the waveform $V_{C5}$ of FIG. 9 into an acceptable speech signal. The filter characteristics can be shaped to compensate for sampling distortion.

The called party operates the muting and a muting control circuit 78 is thus disabled by P13=0 denoting calling status. The active muting circuit at the called station operates conventionally to select the direction of speech transmission according to relative speech levels. The circuit compares the levels on a ratio basis and gives a relative gain advantage to the party which has the throughput. The other party has to exceed the received speech level by the gain advantage, about 6 dB, to reverse the direction of speech.

Various possibilities exist for data input/output in addition to the keypad 50 shown in FIG. 10. A device equipped for high speed data transfer would require additional hardware, e.g. a UART whose serial output and input ports would be connected to DTX and DRXL respectively so that the UART would by-pass the processor. The UART would receive the same clock signal. The processor would handle the protocol setting up a call but the high speed data would not have to pass through the processor.

Another possibility is to use a single pin of the data bus to output serial data from the processor. This would be intended for low data rate applications, e.g. control of a centralized dictation machine from a remote extension by means of keypad operation.

Although the specific example of an 8048 microprocessor has been selected, other microprocessors in the 8048 family can be used in the particular circuits shown and, in principle, entirely different microprocessors can be used with appropriate circuit design.

A simple example of a data form with three bytes has been described, allowing just one byte as an instruction. A format providing great flexibility comprises a preamble bit, byte 1, a one-bit space, byte 2, a one-bit space, byte 3, a one-bit space, byte 4, requiring a total of 36 TDM cycles. Bytes 3 and 4 are instructions with any relevant data and previous references to the third byte become references to the third and fourth bytes.

As already indicated, devices may be of various kinds and it is convenient to divide devices into two classes, namely communication units which are capable of data and speech transfer and peripheral units which together provide a shared resource for system users communicating via the communication units. Any given peripheral will provide enhanced facilities for all or specific users. Thus a peripheral called by a user will normally perform functions in response to user commands whereas other peripherals may provide information to all users on a regular or continuous basis, e.g. time of day, background music. However, any inter-relationship of "peripherals" and "communication units" is in principle possible within the traffic and signalling capabilities of the system. A peripheral can even provide an interface between defined systems (tie lines etc).

One example of a peripheral is a time facility peripheral which provides information to all system users. This peripheral is constructed in manner known per se utilising a high stability crystal frequency reference in conjunction with a microprocessor to provide a local, accurate time display. In addition broadcasts of the current time in hours and minutes are made at regular intervals such as approximately every fifteen seconds. However the peripheral obeys the above described bus protocol by checking that the control slot is free before commencing data transmission. The message format also conforms to the established rules with bytes 3 and 4 carrying the time data. Byte 1 is a special address calling all units and byte 2 identifies the calling unit as the clock. Each called unit decides what to do with the received information. Typically, the time of day will be displayed by a unit so long as it is not engaged in a call. Note that no reply or handshake message is expected from the called units since the message is a broadcast message rather than a request expecting a reply from the addressed unit.

Another general purpose peripheral can provide the facility to store and retrieve messages. Accordingly audio recordings can be left for access by specific parties. Each communications unit can be provided with a "message lamp" which is lit when a recorded message for that unit exists.

A message storage peripheral can comprise a standard communications interface connected to the bus and providing both digital and analogue links to a supervisory storage control unit and an audio storage unit, such as a tape recorder, respectively. The supervisory storage control unit is a controller based on a microprocessor and handles both communication with units in the system and also performing the library functions of labelling and filing information in the tape recorder. This may be a multi-track tape recorder. In handling communication with units, the supervisory storage control unit responds to incoming calls, decides whether the caller wishes to leave or retrieve messages, checks security codes, when used, to maintain confidentiality, and so on. A telephone answering machine may optionally be connected to the supervisory storage control unit and the audio storage unit to provide the standard facilities of a telephone answering machine on night service, for external calls. Messages received in this way will be retrieved by a single communications unit, i.e. that of the receptionist or a specified secretary, who will then pass on messages to the appropriate units.

I claim:

1. A speech and data communication network comprising a two-wire bus, a source of synchronizing pulses connected to the bus, the pulses marking off TDM cycles comprising interleaved time slots, including a control time slot and a plurality of working time slots, a plurality of devices connected to the bus and each including (1) a microprocessor capable of generating and feeding control data pulses into the control time slot, and of responding to data pulses in the control time slot, to establish a channel between a calling device and a called device by selecting a free working time slot, (2) audio processing means for sampling an audio signal and analogue modulating pulses in accordance with the samples to transmit the audio signal, the audio processing means further responding to received analogue modulated pulses to demodulate the audio signal, and (3) a bus interface enabled to transmit or receive the sampled audio signal in the form of analogue modulated pulses in a selected time slot, and wherein the microprocessor is arranged to transmit digital message data by binary modulation of the analog modulated pulses in a selected time slot and to receive digital message data as binary modulated pulses in a selected time slot, whereby the bit value of the digital message data is represented by the absence of pulses.

2. A speech and data communication network according to claim 1, wherein the audio processing means pulse width modulate the pulses.

3. A speech and data communication network according to claim 2, wherein the synchronising pulse is wider than the widest PWM pulse and each device comprises a digital timer which discriminates synchronising pulses as pulses wider than a predetermined value.

4. A speech and data communication network according to claim 1, wherein the source of synchronizing pulses also includes means for feeding a low level, high frequency signal on to the bus and each device includes an injection locked oscillator and a frequency divider for providing local timing waveforms.

5. A speech and data communication network according to claim 1, wherein the microprocessor of a calling device is arranged to find a free time slot by testing slots in turn and treating as free a slot with no pulses therein in a predetermined number of TDM cycles.

6. A speech and data communication network according to claim 5, wherein data is transmitted as 8-bit bytes framed by a single start and stop 0-bits, and wherein the predetermined number is at least 11.

7. A speech and data communication network according to claim 1, wherein all messages sent on the control time slot comprise two words containing the addresses of the addressed and addressing devices, followed by at least one further word constituting an instruction.

8. A speech and data communication network according to claim 1, wherein the time slots other than the control slots are associated in pairs constituting links for full duplex transmission.

9. A speech and data communication network according to claim 8, wherein the source of synchronizing pulses also feeds a low level, high frequency signal on to the bus and each device includes an injection locked oscillator and a frequency divider providing local timing waveforms, and wherein each device comprises a link counter responsive to one of the local timing waveforms and the microprocessor has a group of pins providing link addresses, a pin carrying a bit signifying whether the device is called or calling and decoding circuitry enabling transmission in one half, selected by the said bit, of the link selected when the link counter state matches the link address from the microprocessor and enabling reception in the other half of the selected link.

10. A speech and data communication network according to claim 9, wherein the bus interface comprises a modulator with an input terminal for a speech signal, an input terminal for pulses provided during the time that the decoding circuitry enables transmission in each TDM cycle in which the microprocessor provides a signal commanding transmission of a pulse, and an output terminal connected to a shorting switch across the bus, and a demodulator with an output terminal for a speech signal and an input terminal coupled to the bus during the time that the decoding circuitry enables reception.

* * * * *